United States Patent
Costantini et al.

(10) Patent No.: US 9,917,642 B2
(45) Date of Patent: Mar. 13, 2018

(54) METHOD AND APPARATUS FOR ESTABLISHING A COMMUNICATION PATH IN AN OPTICAL NETWORK

(71) Applicant: Telefonaktiebolaget LM Ericsson (publ), Stockholm (SE)

(72) Inventors: Matteo Costantini, Genoa (IT); Antonio Melis, Genoa (IT); Lorenzo Siri, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/121,611

(22) PCT Filed: Feb. 28, 2014

(86) PCT No.: PCT/EP2014/053976
§ 371 (c)(1),
(2) Date: Aug. 25, 2016

(87) PCT Pub. No.: WO2015/127992
PCT Pub. Date: Sep. 3, 2015

(65) Prior Publication Data
US 2016/0365921 A1     Dec. 15, 2016

(51) Int. Cl.
*H04B 10/079* (2013.01)
*H04B 10/564* (2013.01)
*H04J 14/02* (2006.01)

(52) U.S. Cl.
CPC ..... *H04B 10/07955* (2013.01); *H04B 10/564* (2013.01); *H04J 14/0212* (2013.01)

(58) Field of Classification Search
CPC .................. H04B 10/07955; H04B 10/564
See application file for complete search history.

(56) References Cited

U.S. PATENT DOCUMENTS

| | | | | |
|---|---|---|---|---|
| 2003/0016410 A1* | 1/2003 | Zhou | ................... | H04J 14/0227 398/5 |
| 2003/0016411 A1* | 1/2003 | Zhou | ................... | H04Q 11/0062 398/5 |
| 2004/0052526 A1* | 3/2004 | Jones | ................... | H04J 14/0221 398/50 |

FOREIGN PATENT DOCUMENTS

| | | |
|---|---|---|
| CA | 2 294 555 | 6/2001 |
| WO | WO 01/82516 | 11/2001 |
| WO | WO 2006/008321 | 1/2006 |

OTHER PUBLICATIONS

International Search Report for International application No. PCT/EP2014/053976—dated Oct. 30, 2014.

* cited by examiner

*Primary Examiner* — Dzung Tran
(74) *Attorney, Agent, or Firm* — Baker Botts, LLP (57) ABSTRACT

A method is provided for establishing a communication path in an optical network, the communication path comprising a plurality of sections, wherein the power level of a section is controlled by a respective power control unit of a network node. The method comprises the steps of, in response to a request to establish a communication path, step 201, controlling at least one power control unit to perform a first power-up mode of operation. The first power-up mode of operation comprises the step of setting a power control factor of a respective section of the communication path directly to a value estimated to provide a target power level, step 203.

19 Claims, 9 Drawing Sheets

METHOD AND APPARATUS FOR ESTABLISHING A COMMUNICATION PATH IN AN OPTICAL NETWORK

PRIORITY

This nonprovisional application is a U.S. National Stage Filing under 35 U.S.C. § 371 of International Patent Application Serial No. PCT/EP2014/053976, filed Feb. 28, 2014, and entitled "A Method And Apparatus For Establishing A Communication Path In An Optical Network."

TECHNICAL FIELD

The present invention relates to a method and apparatus for establishing a communication path in an optical network.

BACKGROUND

Optical transmission networks allow all-optical transmission between network nodes. Traffic is carried by optical channels, called lambdas, and optical switching technology, such as Wavelength Selective Switches (WSS), allow lambdas to be switched at network nodes, such as Reconfigurable Optical Add/Drop Multiplexers (ROADMs).

A control layer can be added to this kind of network to control the operation of the nodes. A possible control layer is the Transport Network Control (TNC) layer. One issue in this type of network is the relatively long time required to set-up or establish a communication path. This is a particular problem during traffic recovery or restoration operations. When a fault occurs in a network, it is desirable that traffic is transferred to an alternative path as quickly as possible. Delay in setting up the alternative path can result in heavy loss of traffic.

ROADMs provide routing and power leveling functionality in an optical network at a physical level, through the use of wavelength selective switches (WSSs) and optical channel monitors (OCMs). When a new path is created by a ROADM, the ROADM controls the WSS to open, step by step, a new channel wavelength on a specific port, as described below.

Figure 1:
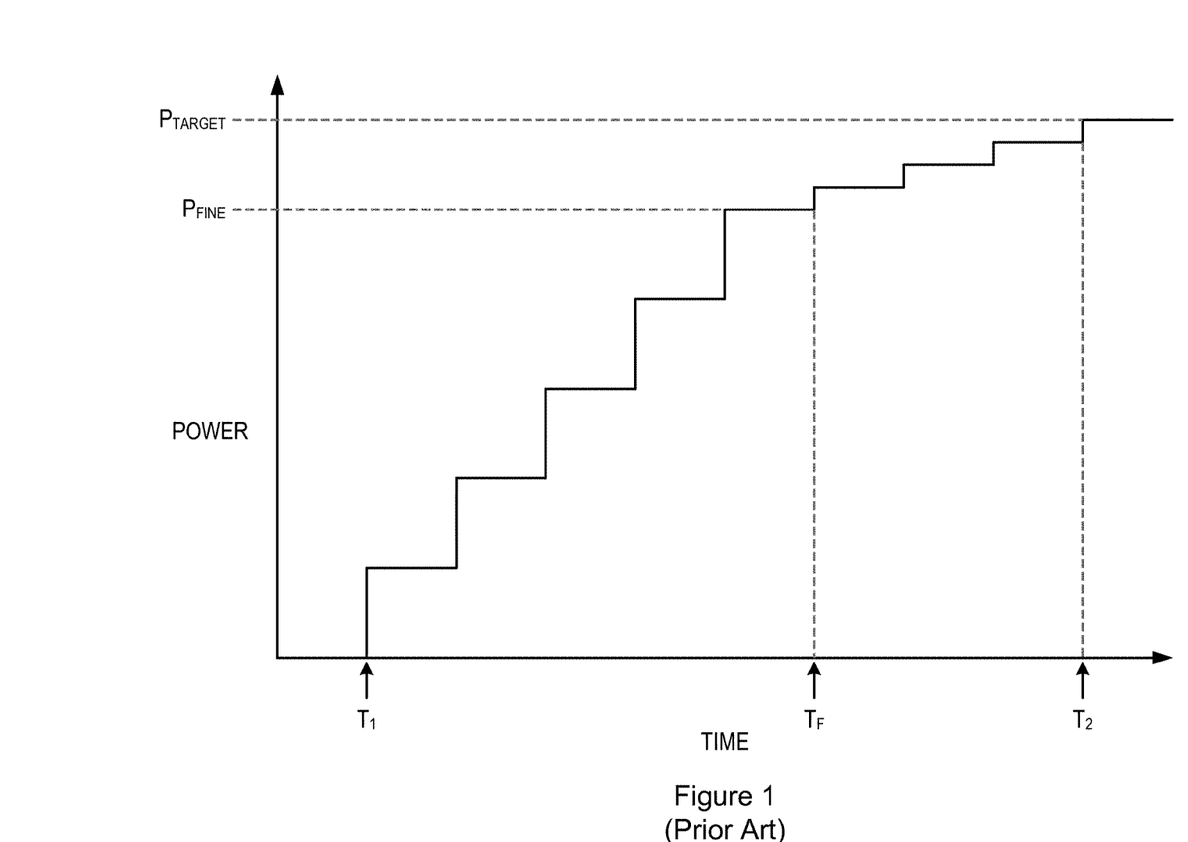
FIG. 1 illustrates a known method of applying power to a new communication path of an optical network.

FIG. 1 shows a known power-up procedure for establishing a communication path. When a new communication path is to be established at time $T_1$, the power level on the communication path is increased in small steps. During each step a power measurement is taken by an optical channel monitor, to provide feedback on the power level of the new channel. This controlled feedback loop, which takes into account an OCM scan, takes in the order of seconds. Once the new channel is "visible" or within a certain range of a target power level ($P_{TARGET}$) for the new channel, for example at a power level $P_{FINE}$, the power level of that channel is managed according to a ROADM power leveling algorithm.

A requirement of a power leveling algorithm, when controlling the power level of a new communication path or channel, is not to affect the traffic on channels that already exist. As a consequence, several small steps are used when setting up a new channel, for example between times $T_1$ and $T_2$, to avoid large changes in the optical power, and in particular to avoid an excessively large power level that might damage a receiver of a subsequent node or component in the communication path. This technique therefore has a delay ($T_2$-$T_1$) associated with powering up the communication path.

Often a communication path can include a chain of ROADMs, each controlling a segment or section of the overall communication path. Each ROADM requires the power level of its section of the new communication path or channel to be created step-by-step in the manner shown in FIG. 1, whereby a WSS opens a path in fixed steps until the channel is detected by the OCM (i.e. between $T_1$ and $T_F$), then each further step is calculated using a smoothing factor (e.g. 0.1 between $T_F$ and $T_2$) to avoid any uncontrolled peak of power from being propagated. Once the channel reaches, or is close to, its target power, this information is propagated to the next ROADM in the path which starts the same process. As a consequence, the time taken for the full communication path to become available is dependent on the number of ROADMs involved in the chain.

Existing solutions such as this work well for preventing oscillations in existing channels (which could otherwise affect the performance of existing channels). However, the complete channel provisioning, particularly in a chain of ROADMs, is in the order of tens of seconds or even minutes. While this might not be an issue when creating a new path for new traffic being installed, it becomes disadvantageous in scenarios where fast restoration is desired by a control plane (such as TNC) for a fast provisioning of an optical path, for example because of an issue or fault in another link of the network.

SUMMARY

It is an aim of the present invention to provide a method and apparatus which obviate or reduce at least one or more of the disadvantages mentioned above.

According to a first aspect of the present invention there is provided a method for establishing a communication path in an optical network, the communication path comprising a plurality of sections, wherein the power level of a section is controlled by a respective power control unit of a network node. The method comprises the steps of, in response to a request to establish a communication path, controlling at least one power control unit to perform a first power-up mode of operation, wherein the first power-up mode of operation comprises the step of setting a power control factor of a respective section of the communication path directly to a value estimated to provide a target power level.

Thus, a communication path is established more quickly.

According to another aspect of the present invention there is provided a method in a node of an optical network, wherein the node forms part of a communication path in the optical network, and wherein the node comprises a power control unit for controlling the power of a section of the communication path. The method comprises the steps of receiving a request to establish a communication path on a section of communication path being controlled by the node, and performing a first power-up mode of operation. The first power-up mode of operation comprises the steps of estimating a value of a power control factor for the section of communication path being controlled by the node to provide a target power level, and setting the power control factor directly to the value estimated to provide the target power level.

According to another aspect of the present invention, there is provided a node of an optical network, wherein the node forms part of a communication path in the optical network. The node comprises a power control unit for controlling the power of a section of the communication path. The power control unit is configured to receive a request to establish a communication path on a section of communication path being controlled by the node, and perform a first power-up mode of operation. The node is configured to perform a first power-up mode of operation, wherein the node is configured to estimate a value of a power control factor for the section of communication path being controlled by the node to provide a target power level, and configured to set the power control factor directly to the value estimated to provide the target power level.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

The embodiments described below refer to a communication path being established in an optical network. It is noted that reference to a communication path is intended to cover any form of communication path, including any form of optical channel, also known as a lambda, or a channel wavelength, and so on. The embodiments are intended to embrace any form of communication path where a power level of the communication path, or a section thereof, is to be set or controlled.

Figure 2:
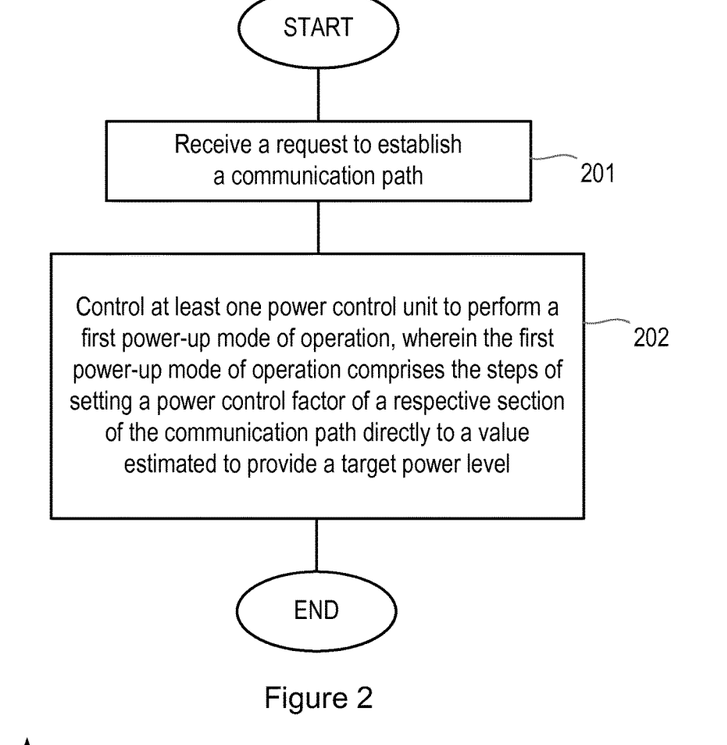
FIG. 2 shows a method according to an embodiment of the present invention.

FIG. 2 shows a method according to an embodiment of the present invention, for establishing a communication path in an optical network. The communication path comprises a plurality of sections, wherein the power level of a section is controlled by a respective power control unit of a network node. The method comprises the steps of, in response to a request to establish a communication path, step 201, controlling at least one power control unit to perform a first power-up mode of operation. The first power-up mode of operation comprises the step of setting a power control factor of a respective section of the communication path directly to a value estimated to provide a target power level, step 203.

As such, rather than stepping up the power level of the communication path in the manner described in the background section, the power control unit of at least one node along the communication path performs the step of setting the power level directly to the target power level. Setting the power level directly to the target power level involves setting the power level in a single step. The single step selects the desired target power level. The target power level may be considered as based on a power control factor. The power control factor which, for example, as will be described in greater detail below, involves estimating how much attenuation may be required to adjust the power level being provided by a power control unit to a particular section of the communication path. In some aspects, the power control unit controls a switch within a node, e.g. ROADM. The switch is an optical switch, for example, configured to switch wavelengths (lambdas). The switch being controlled may be a wavelength selective switch, WSS. The switch is configured to both allow selection of an input port (or output port) and provide a controllable attenuation of power. The switch may be used to control the power level output by the switch, as described according to examples of the invention.

Figure 3:
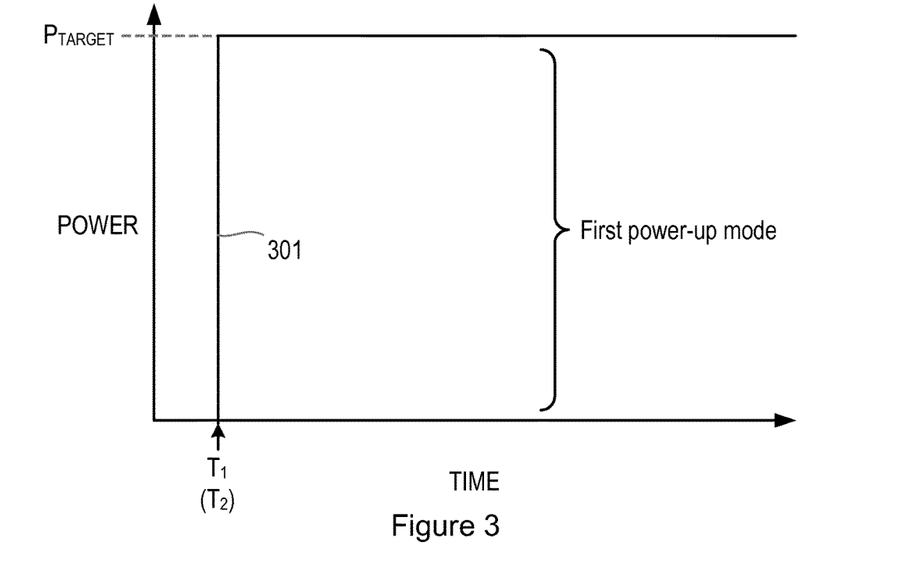
FIG. 3 is an example of a first power-up mode of operation, according to an embodiment of the present invention.

FIG. 3 illustrates how the power control factor is set for a section of the communication path directly to a value estimated to provide a target power level $P_{TARGET}$ at time $T_1$, based on a first power-up mode of operation at time $T_1$. Assuming that the power control factor has been correctly estimated for that section of the communication path, the target power level will be reached substantially at this time, in a single step 301, such that $T_2$ of FIG. 1 falls effectively at the same time as $T_1$, (i.e. no delay since $T_2-T_1=0$). This has the advantage of saving the time associated with ramping up the power level on the communication path. Therefore, if at least one node in the path uses this technique, time will be saved. The time saving is increased for every node which uses this technique, and the time saving maximised when all of the sections of the communication path are powered up in this way. In practice it will be appreciated that system parameters may cause $T_2$ to be slightly delayed compared to $T_1$. For example, when the power step 301 is due to an attenuation change within a wavelength selective switch, WSS, this may require some time to be applied. It is noted, however, that any such system delays are negligible compared to the delays associated with stepping up the power level according to the prior art.

In some aspects, if there is a control loop involving a WSS and an optical channel monitor, OCM, a slight delay may also be imposed by such a control loop. From FIG. 3 it can be seen that the power level is set directly to a desired target power level in a single action or step 301. The setting at the target power level is based on a pre-defined target power level, by setting a power control factor directly to a value determined to provide the pre-defined target power level. This is in contrast to the feedback loop described in the background section.

Figure 4:
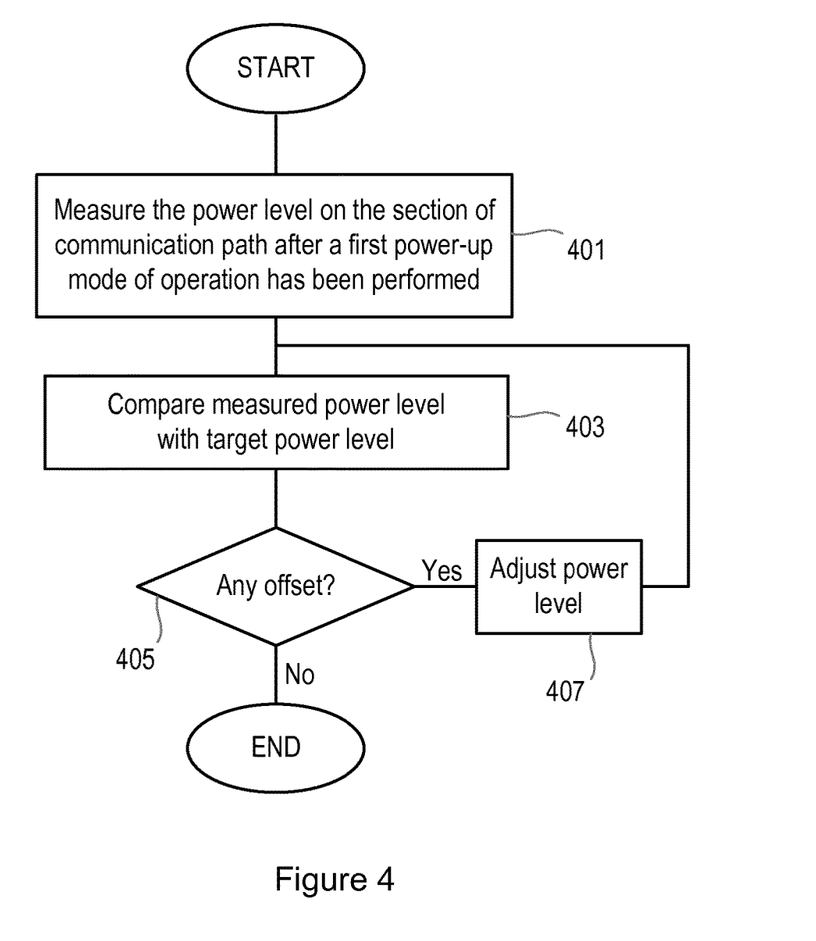
FIG. 4 shows a method according to another aspect of the present invention.
Figure 5:
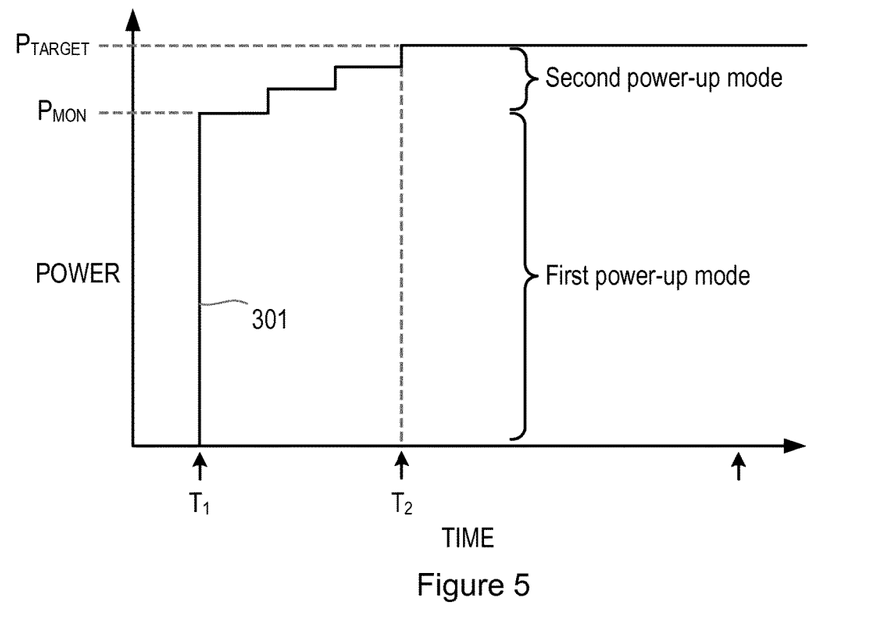
FIG. 5 is an example of first and second power-up modes of operation, according to an embodiment of the present invention.

Referring to FIG. 4, the method may further comprise the steps of controlling the at least one power control unit to perform a second power-up mode of operation, (for example between times $T_1$ and $T_2$ shown in FIG. 5).

According to one embodiment, the second power-up mode of operation comprises the steps of measuring the power level on the section of the communication path after a first power-up mode of operation has been performed, step 401. The measured power level is compared with the target power level, step 403. In step 405 it is determined if there is any offset. If not, no further action is necessarily required. If it is determined in step 405 that there is an offset between the measured power level and the target power level, the power level is adjusted, step 407. The adjustment is until the power level on the section of communication path matches the target power level (for example by repeating steps 403, 405 and 407 as necessary).

FIG. 5 shows an example of the above operation. At time $T_1$ the first power-up mode of operation sets the power level on a section of the communication path to what is estimated to be the target power level. As mentioned above, the setting of the power level is based on setting a power control factor for that section of the communication path directly to a value estimated to provide the target power level (for example based on estimated insertion losses, as will be described later). However, if such estimating of the power control factor is non-ideal, the power level monitored during step 401 of FIG. 4 will be different to the target power level $P_{TARGET}$.

For example, in FIG. 5 although an attempt is made to control the power level directly to a target power level $P_{TARGET}$, i.e. by setting a power control factor directly to a value estimated to provide the target power level $P_{TARGET}$, the power level only actually reached is a power level $P_{MON}$ in response to the first power-up mode 301. This error or offset is due to an error or inaccuracy in estimating the power control factor. The power level may be considered as controlled directly to substantially the target power.

The monitored power level $P_{MON}$ is shown as being less than the target power level. In this event, the power control unit associated with this section of the communication path can be configured to adjust the power level until it matches (or is within a predetermined range) of the original target power level, for example by increasing the power level in one or more steps between time $T_1$ and $T_2$. This may involve adjusting the estimated power control factor, for example adjusting an estimated attenuation value, such that the power level of the section of communication path is correspondingly adjusted.

It is noted that, in use, the monitored power level $P_{MON}$ could also end up being higher than the target power level as a result of the first power-up mode 301, rather than lower as shown in FIG. 5. In which case the power level would be adjusted down to the required target power level. However, in order to reduce the likelihood of damage to receiver devices along the communication path, the step of setting the power control factor can be adapted such that it provides a value which is estimated to provide slightly less than the target power level, i.e. such that any error in the estimating step is more likely to result in a lower than desired power level, as shown in FIG. 5.

From the above it can be seen that, if the setting of the power control factor was based on an incorrect estimate to provide a target power level, then the power level on the section of communication path can be fine tuned, for example using levelling algorithms in a ROADM node, until the power level reaches the target power level. As described above, the second power-up mode uses a feedback loop in order to reach the target power level. The second power-up mode includes a measurement of the optical power, and a comparison with the target power level to adjust and reach the desired optical power. In some examples, a plurality of steps of adjustments (e.g. by changing the attenuation in a node) are used. In some examples, the first and second power-up mode are defined by the time(s) at which they occur. For example, the first power-up mode is at time $T_1$, and the second power-up mode between times $T_1$ and $T_2$.

Thus, the power level may be defined as set using a single estimated or coarse tuning, following by one or more steps of fine tuning. The single estimated tuning is based on a value estimated to provide a target power level. As such, the power level of the respective section is set directly to a power estimated to be the target power level. The subsequent second power-up mode changes the power level by an amount less than the first power-up mode. The second power-up mode provides a fine tuning. In some aspects, the target power level is the final power level of the channel.

According to one embodiment, the step of performing the first power-up mode may be carried out in two or more sections of the communication path. In some examples, the first power-up mode is carried out in parallel in the two or more sections. Two or more sections of the communication path perform the first power-up mode at substantially the same time. For example, the step of performing the first power-up mode may be performed in all sections of the communication path at substantially the same time. Such an embodiment has the advantage that all of the power control units control their respective sections of the communication path to power up in a single step and at the same time to (substantially) the target power level, thereby maximising the amount by which this technique can be used to reduce delays. According to another embodiment, the second power-up mode may also be performed in two or more sections, or in all sections of the communication path, in parallel.

It is noted that some power control units may be configured to perform both the first and second power-up modes if needed, while other power control units may be configured only to perform the first power-up mode.

Figure 6:
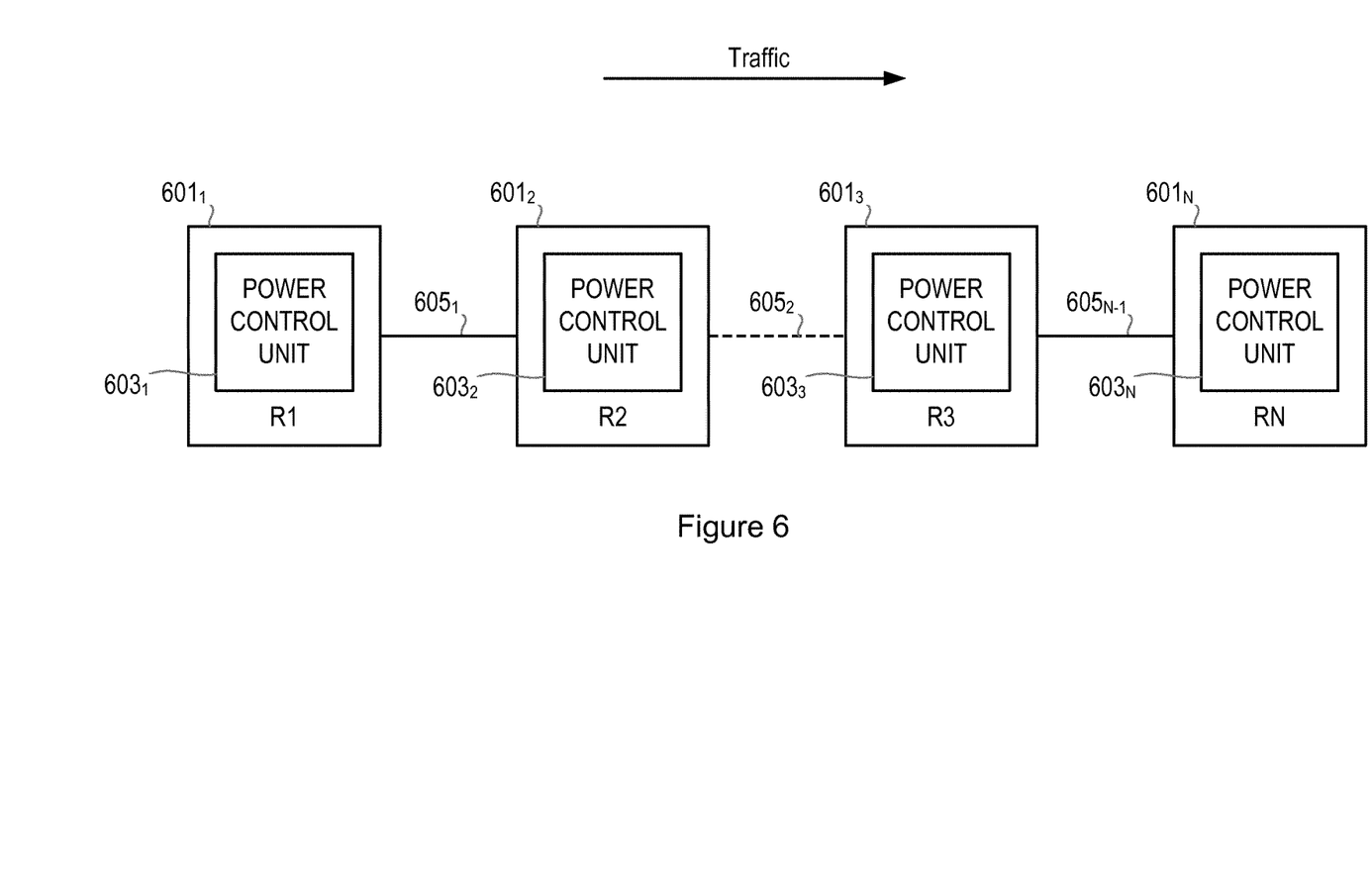
FIG. 6 shows an example of a communication path comprising a plurality of sections and nodes.

FIG. 6 shows an example of a communication path 605 established between a series of nodes $601_1$ to $601_N$. The communication path comprises a plurality of sections $605_1$ to $605_{N-1}$. Each node comprises a power control unit $603_1$ to $603_N$ for controlling a respective section of the communication path. Assuming for simplicity that traffic is travelling from left to right, the power control unit $603_1$ of node $601_1$ controls the power level of the section $605_1$, the power control unit $603_2$ of node $601_2$ controls the power level of the section $605_2$, (and so on such that a power control unit 603 controls the power level on a succeeding or downstream section of the communication path). In practice, it is noted that communication may be two-way, in which case a node may also be adapted to control the power level on a downstream section on the opposite side. It is also noted that in some applications a particular node may not comprise its own power control unit, in which case a section of a communication path may be controlled by a power control unit of another node.

According to one example the first power-up mode and/or second power-up modes of operation are performed in each section of the communication path in series along the communication path 605. For example, the power control unit $603_1$ of node $601_1$ is adapted to control the power level on the section $605_1$ before the power control unit $603_2$ of node $601_2$ begins to control the power level on section $605_2$ of the communication path. Such an embodiment covers the sections of the communication path 605 being powered-up in a domino type arrangement, and has the benefit of saving power-up time at each node along the communication path.

In one example a power control unit associated with a section of the communication path is triggered to start its first power-up mode after detecting that a power control unit of a preceding section has completed its first power-up mode of operation.

According to another example, a power control unit associated with a section of the communication path is triggered to start its first power-up mode after detecting that a power control unit of a preceding section has completed its first and second power-up modes of operation.

It is noted that a power control unit can determine that a preceding power control unit has completed its first power-up mode, either by monitoring the power level on the preceding section of the communication path, or in response to receiving a signal indicating this, for example from the preceding power control unit, or in some other way. For example, if an optical supervisory channel (OSC) is used, then a power control unit may receive a signal from the OSC. Depending on the implementation of a ROADM node, a received signal may be monitored by an optical channel monitor, OCM, or not. If an OCM is not present, a channel presence flag provided in the OSC can be used to determine that a preceding node has completed the first power-up mode of operation.

A power control unit of a "succeeding" or "downstream" node can therefore start its first power-up mode after it has detected in some way that the preceding node (or upstream node) has set its power to the "estimated" target power-level, i.e. after the preceding power control unit has completed its first power-up mode, but before the preceding power control unit has performed any fine tuning operation using the second power-up mode. This saves time because the next node in the chain can start powering up sooner. With the example where the "succeeding" node only starts its first power-up mode after it has detected that the preceding node has set its power level fully to the target power-level, the time saving is not as large since the succeeding power control unit does not start its first power-up mode until after the preceding node has performed its fine tuning operation.

According to another embodiment the first power-up mode and/or second power-up mode is performed in two or more sections of the communication path in parallel.

For example, in one embodiment this is performed in parallel in all sections of the communication path. In such an embodiment the power control units $603_1$ to $601_{N-1}$ of control nodes $601_1$ to $601_{N-1}$ would each power-up the sections $605_1$ to $601_{N-1}$ in parallel to the target power level. The target power level is determined for each separate section by each power control unit $603_1$ to $601_{N-1}$, and implemented by an estimate of the appropriate power control factor for each respective section.

This particular embodiment has the advantage of saving power-up time because the power-up levels are set directly to the target power level in each of the sections of the communication path in parallel. It also has the advantage of removing the dependency between the power-up delay and the number of nodes or sections in the communication path.

According to another aspect of the present invention, the method may comprise the steps of performing a third power-up operation in at least one section of the communication path, to provide added protection in the event that a power control factor has been estimated incorrectly.

According to one embodiment, the first power-up mode and/or second power-up mode is performed in each section of the communication path using the described method, apart from the final section along the communication path. The power control unit associated with the final section of the communication path performs a power-up mode which is different or independent of the preceding sections. For example, if the preceding sections power-up in parallel, the final section may power up after the first power-up mode of the preceding sections. The final section of the communication path performs a first power-up mode in series, following the parallel first (and optionally second) power-up modes of the preceding sections. As described below, the final section may alternatively or in addition power up in a different manner, e.g. in a conventional manner by only increasing power in a series of small steps, rather than allowing an increase in power in a single step based on a pre-defined setting. The subsequent power-up of the final section of the communication path may be termed a third power-up mode.

This has the advantage of saving power-up time because most sections of the communication path have their power-up levels set directly to the target power level, and optionally in parallel. For example, this applies for each section apart from the final section. The separate power-up of the final section provides the safety measure of establishing the power level of the final section of the communication path in a more conservative way. For example, this prevents the whole chain of sections, and its output, being set in an "open loop" setting and directly reaching a transponder receive port. Therefore, in the event of an error, rapid change or transient in power level in an earlier section, this final section power-up protects the node at the output of the chain, e.g. transponder. This type of embodiment also has the advantage of effectively reducing the dependency between the power-up delay and the number of nodes or sections in the path.

According to one example, the third power-up mode comprises ramping up the power in the final section of the communication path in a plurality of steps. According to another example, the third power-up mode comprises ramping up the power in the final section of the communication path in a plurality of steps of a first level, followed by a plurality of steps at a second level. According to another example, the third power-up mode comprises increasing the power in the final section of the communication path in a gradual manner. According to another example, the third power-up mode comprises increasing the power in the final section of the communication path in a single step based on an estimated power factor, followed by a fine tuning based on monitoring, as described above for the preceding sections as the first and second power-up modes.

According to another example, the third power-up mode comprises increasing the power in the final section of the communication path at a first rate during a first period, and a second rate during a second period, wherein the first rate is quicker than the second rate.

The third power-up mode may be triggered at different times. According to one example, the third power-up mode is triggered after determining that a power control unit associated with a preceding section of the communication path has completed its first power-up mode. According to another example, the third power-up mode is triggered after determining that a power control unit associated with a preceding section of the communication path has completed its first and second power-up modes. According to another example, the third power-up mode is triggered substantially at the same time as a power control unit of a preceding section of the communication path is triggered to start its first power-up mode.

According to yet another example, the third power-up mode is triggered after determining that one or more power control units of preceding sections have completed their first or second power-up modes, and after one or more power control units of the preceding sections have verified that the power level on their respective sections of communication path are within a predetermined threshold of the target power level.

As can be seen from the above, there are several times at which the power control unit controlling the power level of the final section of the communication path can perform its third power-up mode. The last example includes an additional safety check whereby an OCM measure can be made, for example, by one or more nodes controlling the preceding sections, to determine if there are any major issues on the communication path, e.g. the power being much higher than intended.

In some aspects, one or more amplifiers of the nodes are controlled as part of aspects of the invention. In particular, a constant gain in all paths is set. The constant gain is set as soon as the node (e.g. ROADM) receives the cross-connections for setting up the communication path. In some aspects, the amplifiers are maintained at the same gain as previously (i.e. frozen) without waiting to detect the channels. This provides for the same performance with a different number of channels. The triggering of the freezing of the amplifiers may be considered a step of the method described, e.g. prior to the power level being directly set to approximately the target power level. This supports further aspects of the invention, i.e. the provisioning/leveling of new channels (e.g. by ROADM) when a new path is requested.

Figure 7:
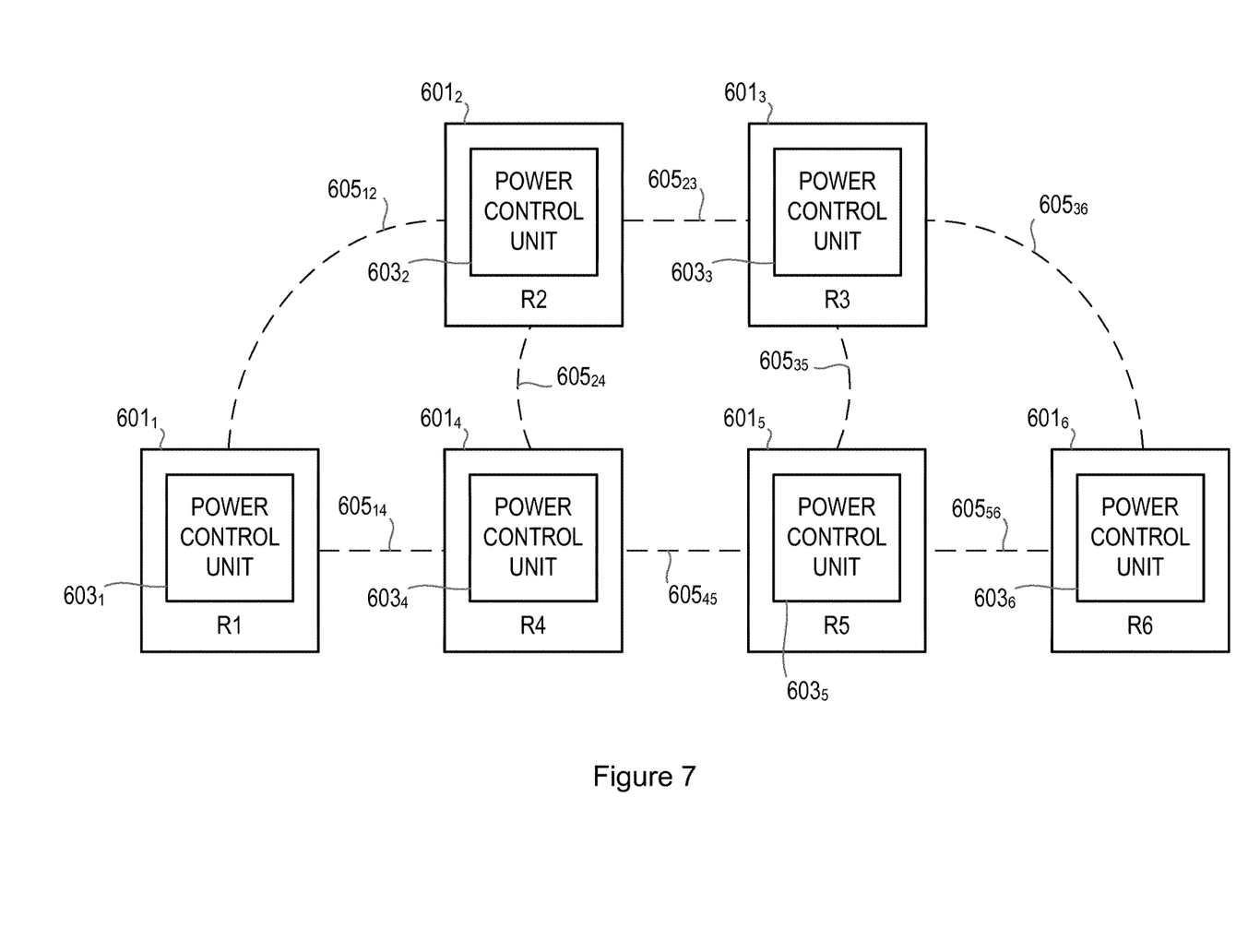
FIG. 7 shows examples of other communication paths comprising a plurality of sections and nodes.

FIG. 7 shows an example of an optical network comprising a plurality of nodes $601_1$ to $601_6$, for example ROADMs, each having a respective power control unit $603_1$ to $603_6$. Consider, for example, a first communication path, Path A, from node $601_1$ to $601_2$ to $601_3$ to $601_6$, (i.e. made up from sections $605_{12}$, $605_{23}$ and $605_{36}$). Consider, for example, a second communication path, Path B, from node $601_1$, to $601_2$ to $601_4$ to $601_5$ to $601_3$ to $601_6$, (i.e. made up from sections $605_{12}$, $605_{24}$, $605_{45}$, $605_{35}$ and $605_{36}$). Consider, for example, a third communication path, Path C, from node $601_1$, to $601_4$ to $601_5$ to $601_6$, (i.e. made up from sections $605_{14}$, $605_{45}$ and $605_{56}$). The path may be a lightpath.

If setting up any of these paths, for example Path A, using conventional techniques, the first ROADM in the path (node $601_1$) would ramp up the channel (or section of communication path) $605_{12}$ up to a threshold level where it is visible to an optical channel monitor, for example in 1 dB steps. Then, the ramp-up might continue in smaller steps, for example 0.1 dB steps, until the channel has reached a target power level. At this threshold level the channel presence can also be set into an optical supervisory channel, OSC, for use in an embodiment where a subsequent node may rely on a OSC flag for indicating that a preceding node has been powered up to a particular level. Further steps of fine tuning can then be carried out using normal leveling algorithms of a ROADM. Next, the subsequent ROADM in the path, node $601_2$ in the example of Path A, would iterate the procedure above once the channel presence is received from OSC, in order to power up section $605_{23}$ of the communication path. This continues for node $601_3$, until the final section $605_{36}$ of the communication path has been ramped up.

Next, consider that a restoration operation is required from Path A to either Path B or Path C. In such a restoration all amplifiers in the paths (e.g. EDFAs) would be frozen (i.e. gain maintained at a constant level) in response to a new cross-connection command, for example using an OSC flag. A new path would then be established using the techniques described above. The restoration time would be as follows.

Restoration time (leveling cycles) equals:
1 cycle (for freezing paths), plus
10~15 cycles×ROADMs (i.e. 10 to 15 cycles per ROADM involved), plus
0~1 cycle ×ROADMs−1 (depending on synchronization of ROADMs software leveling). It is noted that a Receiver ROADM is counted if directionless. The cycles above may involve steps such as performing an OCM scan, calculating new attenuation values for a WSS, checking new cross-connection commands, checking if EDFAs have to be frozen, setting new attenuation values for a WSS, and so on.

Thus, for example if it is assumed that a restoration is performed from Path A to Path B, the approximate restoration time is determined as:

Path $A$ to $B$,1 $ch$=>1+10~15*5(i.e.$R2,R4$, $R5, R3$, $R6$)+0~1*4( . . . )=51 to 80 cycles.

If it is assumed that a restoration is performed from Path A to Path C, the approximate restoration time is determined as:

Path $A$ to $C$, 1$ch$=>1+10~15*4(i.e. $R1, R4, R5, R6$)+0~1*3( . . . )=41 to 64 cycles.

It is noted that, since Path A and B have a first connection between R1 and R2 in common, the setting of R1 does not necessarily require changing. This is why R1 is included in the above calculations for Path A to Path C, but not in Path A to Path B.

In contrast to the above, consider an example of an embodiment of the present invention, in which each node, in cascade (or series) will apply the first power-up mode of operation, followed by a second power-up mode of operation, before a subsequent node performs the first and second power-up modes of operation. In other words, such an example would involve:

Freeze all paths triggered by a new cross-connect command, (for example using an OSC flag);
First ROADM will attempt to reach target power level using first power-up mode, and set channel presence into OSC for subsequent ROADM;
Further steps of fine tuning performed in second power-up mode;
Each subsequent ROADM in the path will iterate the steps above once the channel presence is received form OSC.
Restoration time (leveling cycles) equals:
1cycle (for freezing paths), plus
1 cycle×ROADMs (i.e. 1 cycle per ROADM involved), plus
0~1 cycles×ROADMs-1 (depending on synchronization of ROADMs sw leveling). It is noted that a Receiver ROADM is counted if directionless.

Thus, for this embodiment of the invention, if it is assumed that a restoration is performed from Path A to Path B, the approximate restoration time is determined as:

Path $A$ to $B$,1 $ch$=>1+1*5 (i.e. $R2, R4, R5, R3, R6$)+0~1*4( . . . )=6 to 10 cycles.

If it is assumed for this embodiment that a restoration is performed from Path A to Path C, the approximate restoration time is determined as:

Path $A$ to $C$, 1$ch$=>1 +1*4(i.e. $R1, R4, R5, R6$) 30 0~1*3( . . . )=5 to 8 cycles.

Therefore, it can be seen that this example of an embodiment of the invention reduces the number of cycles by a significant amount (e.g. from 51-80 to 6-10 cycles when switching from Path A to B, or from 41-64 to 5-8 cycles, when switching from Path A to C.

Next, consider an example of an embodiment of the present invention, in which each node, apart from the last one, will apply in parallel the first power-up mode of operation, followed by a second power-up mode of operation, while other nodes (apart from the last one) also apply the first and second power-up modes of operation. Such an example would involve:

Freeze all paths triggered by a new cross-connect command, (for example using an OSC flag);

All ROADMs (apart from last node) will attempt to reach target power level using first power-up mode (by estimating an attenuation value required to reach the target power level);

Last ROADM awaits channel presence, for example from OSC, and then attempt to reach target power level, for example in 1 or 2 cycles to prevent a completely open loop power from reaching a receiver);

Further steps of fine tuning performed;

Restoration time (leveling cycles) equals:

1 cycle (for freezing paths), plus 1 cycle (i.e. set all ROADMs involved, apart from last ROADM), plus 2 cycles (i.e. last ROADM), plus 0~1 cycles (synchronization of last ROADM).

Thus, for this embodiment of the invention, if it is assumed that a restoration is performed from Path A to Path B, the approximate restoration time is determined as:

Path A to B, 1ch=>1+1 (for R2, R4, R5, R3 in parallel)+2 (R6)+0~1 (R6)=4 to 5 cycles.

If it is assumed for this embodiment that a restoration is performed from Path A to Path C, the approximate restoration time is determined as:

Path A to C, 1ch=>1+1 (for R1, R4, R5 in parallel R6)+2 (R6) +0~1 (R6)=4 to 5 cycles.

Therefore, it can be seen that this example of an embodiment of the invention also reduces the number of cycles by a significant amount (e.g. from 52-82 to 4-5 cycles when switching from Path A to B, or from 42-65 to 4-5 cycles, when switching from Path A to C.

It can also been seen that the embodiment above removes the number of ROADMs involved from having any effect on the overall power-up time delay.

Furthermore, if the "safe" power-up option is removed from the final stage. The power-up level would be reached in just 2 cycles.

Figure 8:
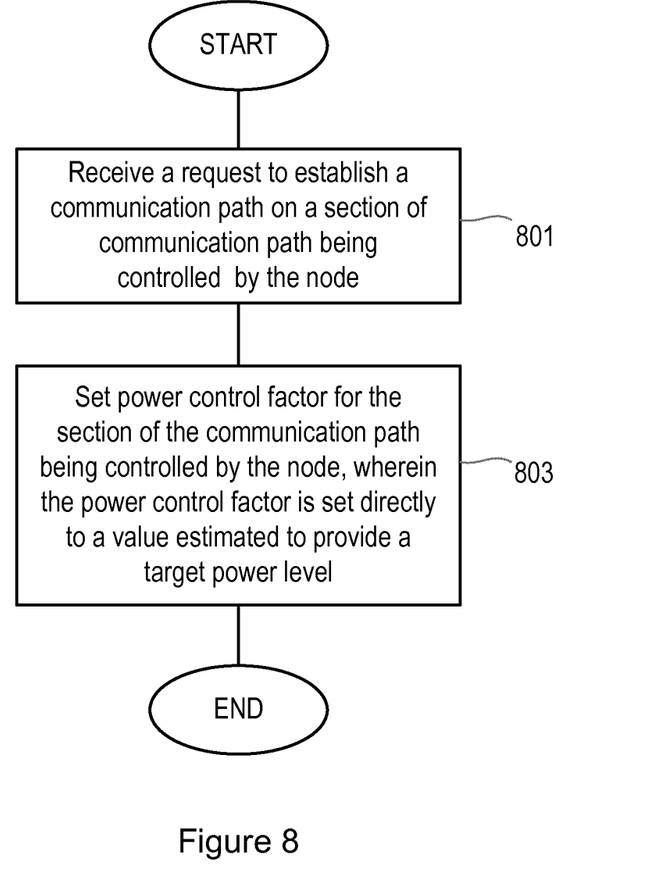
FIG. 8 shows a method performed by a node, according to an embodiment of the present invention.

FIG. 8 shows the steps that may be performed in a node of an optical network, for example a ROADM, according to another example of an embodiment of the present invention, wherein the node forms part of a communication path in the optical network, and wherein the node comprises a power control unit for controlling the power of a section of the communication path (for example if a channel is going to a "fixed" add/drop unit 1007 of FIG. 10 described later, through a ROADM unit $1001_1$). The method comprises the steps of receiving a request to establish a communication path on a section of communication path being controlled by the node, step 801. A first power-up mode of operation is performed, wherein the first power-up mode of operation comprises the steps of setting a power control factor for the section of communication path being controlled by the node, wherein the power control factor is set directly to a value estimated to provide a target power level, step 803. In some aspects, the step 803 may be considered as estimating or determining a power control factor for the section of communication path being controlled. The determination is based on pre-defined or pre-determined values, rather than current measurements of optical power. The determined value of the power control factor is intended to provide the target power level. The power control factor is set directly to the determined value, i.e. in a single step.

The power control factor may relate to an attenuation value required to attenuate a WSS of a power control unit controlling the power level of a respective section of the communication path, to obtain the target power level for that section of the communication path.

Figure 9:
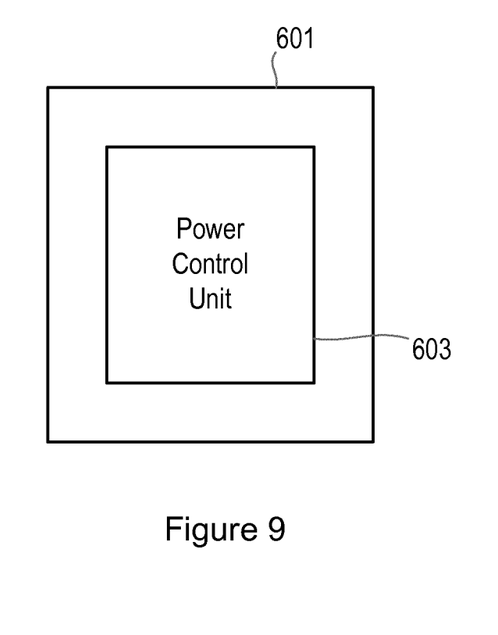
FIG. 9 is an example of a node according to another embodiment of the invention.

FIG. 9 shows an example of a node 601 of an optical network, according to an embodiment of the present invention, wherein the node forms part of a communication path in the optical network. The node 601 comprises a power control unit 603 for controlling the power of a section of the communication path. The power control unit 603 is configured to receive a request to establish a communication path on a section of communication path being controlled by the node, and perform a first power-up mode of operation. The first power-up mode of operation comprises the steps of setting a power control factor for the section of communication path being controlled by the node, wherein the power control factor is set directly to a value estimated to provide a target power level.

The various examples described above have the advantage of not only increasing the speed at which a node such as a ROADM can set up a new path, but also provide a new path in a time that is independent from the number of ROADMs or nodes involved.

Figure 10:
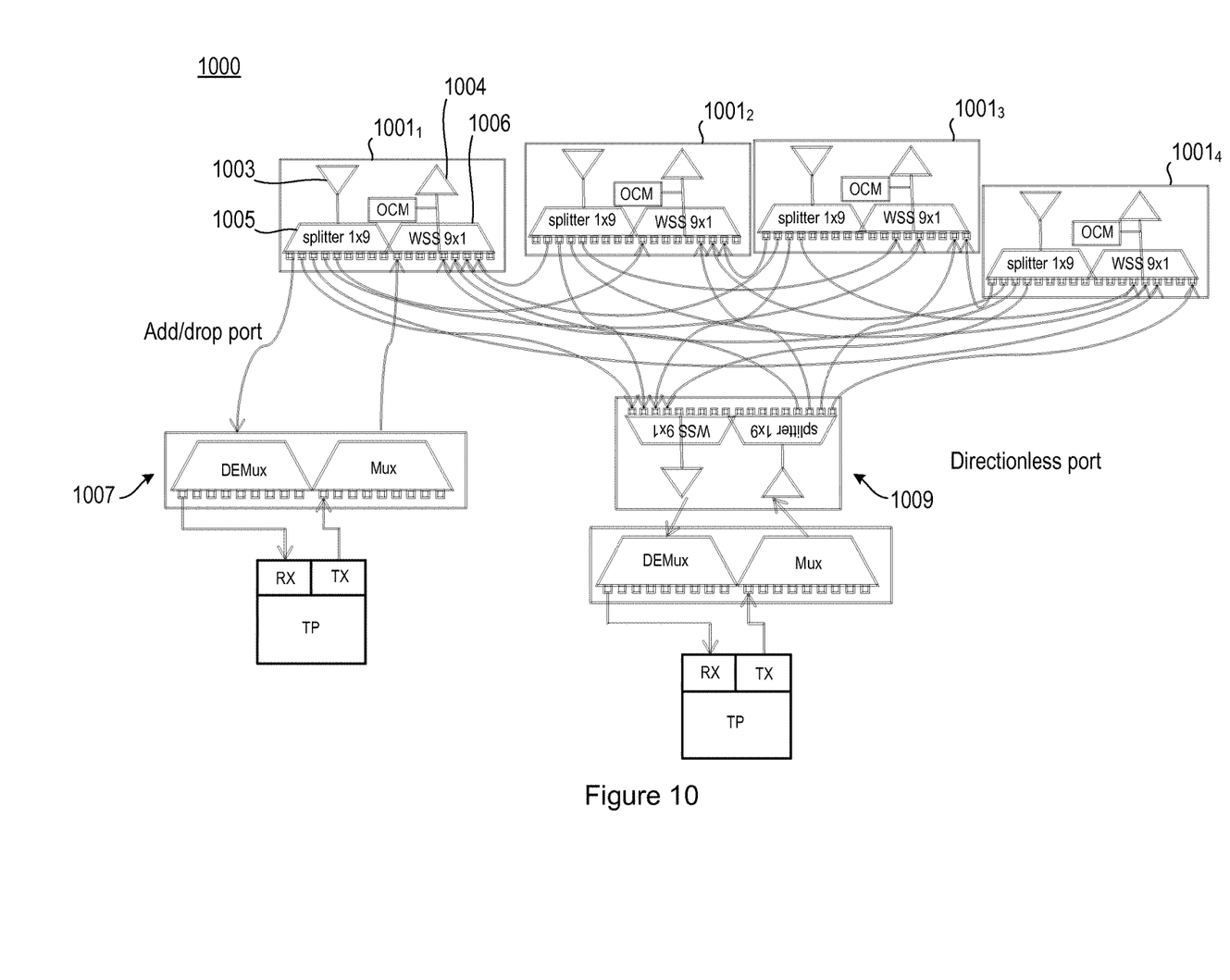
FIG. 10 is an example of a node, according to another embodiment of the invention.

Referring to FIG. 10, a more detailed example of a reconfigurable optical add/drop multiplexer (ROADM) 1000 is shown, which consists, for example, in a set of units (cards or stand-alone sub-racks) $1001_1$ to $1001_4$, one for each direction of a communication path. Each unit 1001 typically comprises a receiver RX amplifier 1003 and a transmitter TX amplifier 1004, for example Erbium Doped Fiber Amplifiers (EDFAs). A 1×N splitter 1005 is provided on the Rx path and a N×1 wavelength selective switch (WSS) 1006 on the TX path (N determining the number of ways of the ROADM). Optical channel monitors (OCMs) are provided to support a leveling function performed by a ROADM, and an optical supervisory channel (OSC). The ROADM comprises an add/drop port 1007 and a directionless port 1009.

As mentioned in the embodiments above, the first power-up mode involves setting the power level of a section of a communication path to a target power level, based on a power control factor which is set to a value estimated to provide the target power level.

Therefore, in an embodiment where a power control unit forms part of a ROADM, the method involves having knowledge of the insertion loss (IL) of components present in both a receiver Rx path and a transmit Tx path, for example by storing such values in the ROADM. The insertion loss values may be obtained from measurements carried out during manufacturing, or assembly, or testing of a ROADM or a component thereof. Insertion loss values may also be determined, either as an alternative, or in addition to the above, using test data before or during use of the ROADM or component thereof.

For example, in a receiver path the insertion loss may comprise insertion losses associated with a 1×N power splitter plus an optional tap-monitor (not shown), for each of the N ports. In a transmitter path the insertion loss may comprise insertion losses associated with the wavelength selective switch loss, plus tap loss for OCM monitoring, plus an optional tap-monitor loss, for each of the N paths.

Once a new path request is sent to the ROADMs involved in the setting up of a new communication path, each ROADM will act independently to control the power level on its respective section of the overall communication path. As described above, various embodiments can involve different ROADMs operating in series, or in parallel, or in a combination of series and parallel (for example where all ROADMs operate in parallel, apart from the last one).

As a first step, an optical amplifier (e.g. EDFA) following the ROADM will be "frozen" (kept in constant gain), for example using some OSC protocol. The gain can be kept constant in this way to prevent impact on an existing channel when new ones will be added.

Next, the power control factor (or attenuation figure) to be applied to the WSS is calculated based on the insertion loss data of the RX and TX path, the target leveling power, and the RX power. For example, if the required path is from line 2 to line 4 of a ROADM (for example from unit $1001_2$ to $1001_4$ of FIG. 10) the attenuation can be set as follows:

Attenuation=[Unit 2 EDFA *rx* Per channel Power]–[insertion loss *rx* unit 2 (path to port connected to unit 4)]–[insertion loss *tx* unit 4 (path from port connected to unit 2)]–[leveling target power line 4]

In other words, in this example the attenuation value is calculated based on:
1) the per channel power of an amplifier (e.g. EDFA) driving the receiver path of unit 2 ($1001_2$); minus
2) the insertion loss of unit 2 (e.g. the insertion loss associated with the path to the port connected to unit 4); minus
3) the insertion loss of unit 4 (e.g. the insertion loss associated with the path from the port connected to unit 2); minus
4) the leveling target power of line 4.

It is noted that in part 1) above, it is the per channel power that is provided (EDFA set accordingly) at the output of a receiver EDFA. It is assumed that when the EDFA is frozen (set to have a constant gain) it provides the same per channel power to new channels.

In part 2) above, the insertion loss associated with the path to the port connected to unit 4 comprises a path from line 2 to 4. This is, a path corresponding to $1003_2$, $1005_2$, a patch cord between $1001_2$ and $1001_4$, then $1006_4$ and $1004_4$.

In part 3) above, the channels reach the input port to the receiver EDFA of unit $1001_2$, which is in fixed gain so the EDFA will provide it the same power of an existing channel. The 1×9 splitter will split the power and broadcast it to all other ROADM units. The unit $1001_4$ will have, on the WSS input port connected with unit $1001_2$, the new channel so if the WSS "opens" the path of that channel it will reach the WSS output where the OCM can measure its power. The transmitter EDFA of unit $1001_4$ is frozen as well, so as the WSS "opens" the new channel to the correct power level the EDFA will launch it with the correct power into the next span.

It is noted that WSSs are actually in charge of routing channels in the correct direction (by selecting for each wavelength the relative input port) and of levelling the channel (by setting the appropriate attenuation level for each wavelength from all input ports). The levelling is done together with OCM which measures channel power and provides feedback to a WSS. The power level at which all channels are set is termed the "levelling target power". Basically, a power level is set at the output of the WSS, where there is the OCM monitoring, and the ROADM control loop will keep all the channels at this level.

The insertion losses mentioned above are mainly internal to a ROADM. It is noted that the paths between ROADMs do not generally affect the determination of the attenuation values, since these are just patch cords which add negligible losses.

FIG. 10 therefore shows an example of the typical insertion losses along a path or channel, to help illustrate how an attenuation value can be determined. If, for example, a receiver EDFA provides about 0 dBm of per channel power (the gain depending on the previous span loss), then a 1×9 splitter will have about 10 dB of insertion loss. In such an example the per channel power exiting unit $1001_2$ is about –10 dBm. If the path passes through a patch cord between unit $1001_2$ and unit $1001_4$, the channel reaches an input port of the WSS of unit $1001_4$. The WSS is initially closed (very high attenuation) for that channel. The WSS loss (bulk loss, not considering the attenuation range used to manage channels) plus the power splitter for the OCM will contribute about 5 dB of insertion loss. The levelling target power could be about –20 dBm. Thus, having the channel at an input power of about –10 dBm, considering 5 dB of bulk insertion loss, the WSS will need to add 5 dB of attenuation in order to have the channel output power aligned with the levelling target power of –20 dBm. The transmitter amplifier will have a per channel output power of about 0 dBm, so a gain of 20 dB.

In the examples described above the power on a section of communication path is generally controlled by a power control unit of a preceding node. However, it is noted that the power on a section of a communication path may also be controlled by a power control unit of a succeeding node. For example, referring to FIG. 10, if a channel is going to "fixed" add/drop unit 1007, passing through unit $1001_1$, it only finds the 1×9 splitter and no WSS, so there is no power control in this ROADM. On the other hand, if the channel is going to the directionless port 1009 it will pass through a WSS of directionless port 1009, so into a power control unit. As such, the last section of a communication path can be controlled by the last ROADM which comprises a power control unit involved in the new path creation.

It is therefore noted that the power control factor can relate to an attenuation value of a switch, the attenuation value being an attenuation value estimated to achieve the target power level for that section of the communication path.

The power control factor may also relate to an attenuation value estimated to be applied to a section of the communication path before an optical amplifier controlling the power level of the section of the communication path, the attenuation value being the attenuation value estimated to achieve the target power level for that section of the communication path.

It is noted that the power control factor relates to an attenuation value to be applied to a section of a communication path, wherein the attenuation value is determined based on one or more optical or physical parameters of the section of communication path being controlled, and/or one or more optical or physical parameters in any components associated with the section of communication path being controlled.

As indicated in the examples above, an optical or physical parameter may comprise an insertion loss of the section of communication path being controlled, and/or an insertion loss associated with one or more components in the section of communication path being controlled.

In order to set the power level as close as possible to the target power level, the estimated power control factor (e.g. attenuation value) needs to be as accurate as possible, such that the resultant power is as close as possible to the target power level. Therefore, embodiments of the invention can make the relevant parameters readily available, such that a power control factor can be determined more accurately.

According to one example, parameters relevant to the determination of an insertion loss, for example, can be made available through the use of an inter-unit message (or inter-node message) to provide data to the relevant power control units (for example to a WSS, which is in the transmitter side, of the corresponding receiver unit for the specific path).

Once a power control factor (e.g. attenuation figure) has been determined for a specific communication path (or channel), this can be applied by a power control unit, such as a WSS, in a single step to set the power level on a section of the communication path, in a sort of "open loop" setting if compared to a standard leveling algorithm which foresees OCM measurements and then attenuation setting in several steps of a closed feedback loop.

After this "open loop" setting, a ROADM can return to a normal channel leveling operation, if desired, with OCM measures, computing the power difference (delta power) between a target power figure and a measured power figure, and adjust a power control factor (attenuation value) accordingly, for example using a smoothing factor. Further fine tuning of the power control factor, and hence the power level, can be executed according to this "normal" leveling loop.

When all sections of a communication path (or all channels) are correctly leveled, the amplifiers, such as EDFAs, can return to a standard behavior. As such the gain settings are no longer frozen.

As mentioned above, in some embodiments the last ROADM in a path (e.g. the last unit with a WSS) can be configured to operate with a different behaviour, as a precaution to prevent a complete ROADM chain open loop setting reaching a transponder receiver port directly. In such an embodiment this last ROADM is configured to keep the WSS closed for the new path for a predetermined number of cycles, for example a couple of cycles (during which all other ROADMs will "create" the new path and will have at least one OCM measure of the new channel to detect for any possible issues) and then open it. The final stage can open its section of the path the same ways as all the others, with the calculation of the power control factor (attenuation) to set in a single "open loop" step, or use power variation techniques, for example a ramp comprising a plurality of steps, or the other techniques mentioned above.

The power control factor (e.g. attenuation value) may be determined during manufacture or assembly of a component of a node, or determined using test signals before or during use of a component in a node.

In one embodiment the step of setting a power level comprises the steps of: setting a constant gain of all optical power amplifiers controlling a respective section of the communication path, until the communication path has been established.

The method is applicable to directionless and colorless configuration, using the same concepts as described herein. Each unit, colorless or directionless, present in the path, may have its component insertion loss (IL) stored and the attenuation, to be set by WSS, calculated and applied in a single step.

The embodiments of the invention have the advantage of improving the operation of a network at a physical actuation level, and therefore offer additional and/or alternative benefits to those offered by control algorithm solutions at a control layer level.

The examples described above provide a new method to provide an optical path, which improves the time to have a requested path ready for a single a ROADM, and hence the time to have the requested path ready for a full ROADM chain.

The embodiments of the invention therefore define a new leveling method within a node such as a ROADM, to reduce to minimum the number of steps (of a WSS-OCM control loop) required to have a new path available, and to enable parallel operation within ROADMs involved in a communication path, and to remove the dependency of the ROADM number to the total set-up time of a communication path.

Aspects of the present invention may comprise a computer program or computer program product, configured to run on a computer, processing circuitry or processing unit, to carry out at least some of the functions described. Aspects of the invention may comprise a processing circuitry or processing unit configured to implement the method described, for example, using software, hardware or firmware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for establishing a communication path in an optical network, the communication path comprising a plurality of sections, wherein the power level of a section is controlled by a respective network node, the method comprising:
   receiving a request to establish a communication path;
   estimating, based on one or more pre-determined optical or physical parameters of the section of communication path being controlled, and/or one or more optical or physical parameters in any components associated with the section of communication path being controlled, a power control factor to provide a target power level;
   performing a first power-up operation, wherein the first power-up operation comprises setting a power control factor of a respective section of the communication path directly to the estimated power control factor.

2. A method as claimed in claim 1, further comprising performing a second power-up operation, wherein the second power-up operation adjusts the power control factor of the respective section to fine tune the power level.

3. A method as claimed in claim 2, wherein the second power-up operation comprises:
   measuring the power level on the section of the communication path after a first power-up mode of operation has been performed;
   comparing the measured power level with the target power level;
   determining if there is an offset, and, if so;
   adjusting the power level until the power level on the section of communication path matches the target power level.

4. A method as claimed in claim 1, wherein the first power-up operation or second power-up operation is performed in two or more sections in parallel.

5. A method as claimed in claim 1, wherein a network node associated with the final section of the plurality of sections of the communication path operates to power-up differently than one or more of the preceding sections.

6. A method as claimed in claim 5, wherein the final section of the communication path powers-up in a third power-up operation, wherein the third power-up operation comprises:

ramping up the power in the final section of the communication path in a plurality of steps; or ramping up the power in the final section of the communication path in a plurality of steps of a first level, followed by a plurality of steps at a second level; or increasing the power in the final section of the communication path in a gradual manner; or increasing the power in the final section of the communication path at a first rate during a first period, and a second rate during a second period, wherein the first rate is quicker than the second rate; or increasing the power in the final section of the communication path in the same manner as the one or more preceding sections.

7. A method as claimed in claim 6, wherein the third power-up mode is triggered:

after determining that a network node associated with a preceding section of the communication path has completed its first operation; or after determining that a network node associated with a preceding section of the communication path has completed its first and second power-up operations; or substantially at the same time as a network node associated with a preceding section of the communication path is triggered to start its first power-up operation; or after determining that one or more network nodes of preceding sections of the communication path have completed their first or second power-up operations, and after one or more of the network nodes of preceding sections have verified that the power level on their respective sections of communication path are within a predetermined threshold of the target power level.

8. A method as claimed in claim 1, wherein the first power-up operation or second power-up operation is performed in each section of the communication path in parallel, apart from the final section of the communication path, wherein the final section of the communication path powers-up in series to the preceding sections.

9. A method as claimed in claim 1, wherein the power control factor relates to an attenuation value of a switch, the attenuation value being the attenuation value estimated to achieve the target power level for that section of the communication path.

10. A method as claimed in claim 1, wherein the power control factor relates to an attenuation value estimated to be applied to a section of the communication path before an optical amplifier controlling the power level of the section of the communication path, the attenuation value being the attenuation value estimated to achieve the target power level for that section of the communication path.

11. A method as claimed in claim 10, wherein the attenuation value is determined during manufacture or assembly of a component of a node, or determined using test signals before or during use of a component of a node.

12. A method as claimed in claim 1, wherein an optical or physical parameter comprises an insertion loss of the section of communication path being controlled, and/or an insertion loss associated with one or more components in the section of communication path being controlled.

13. A method as claimed in claim 1, wherein the method further comprises setting a constant gain of all optical power amplifiers controlling a respective section of the communication path in the chain of nodes, until the communication path has been established.

14. A method as claimed in claim 1, wherein the network node controls an attenuation value per channel.

15. A method as claimed in claim 1, wherein the network node comprises a reconfigurable optical add/drop multiplexer (ROADM) of an optical network.

16. A method in a node of an optical network, wherein the node forms part of a communication path in the optical network, and wherein the node comprises a power control unit far controlling the power of a section of the communication path, the method comprising:

receiving a request to establish a communication path on a section of communication path being controlled by the node; and performing a first power-up operation, wherein the first power-up operation comprises the steps of:

estimating a value of a power control factor for the section of communication path being controlled by the node to provide a target power level, and setting the power control factor directly to the value estimated to provide the target power level.

17. A method as claimed in claim 16, wherein the power control factor relates to an attenuation value estimated to be applied to a section of the communication path before an optical amplifier controlling the power level of the section of the communication path, the attenuation value being the attenuation value estimated to achieve the target power level for that section of the communication path.

18. A node of an optical network, wherein the node forms part of a communication path in the optical network, the node comprising:

a power control unit configured to control the power of a section of the communication path, wherein the power control unit is configured to receive a request to establish a communication path on a section of communication path being controlled by the node; and the node is configured to perform a first power-up operation, wherein the node is configured to estimate a value of a power control factor for the section of communication path being controlled by the node to provide a target power level, and configured to set the power control factor directly to the value estimated to provide the target power level.

19. A node as claimed in claim 18 wherein the power control factor relates to an attenuation value of a switch, the attenuation value being the attenuation value estimated to achieve the target power level for that section of the communication path.

* * * * *